United States Patent [19]

Ajima

[11] Patent Number: 5,363,365
[45] Date of Patent: Nov. 8, 1994

[54] OPTICAL PICKUP APPARATUS INCLUDING A MOVEABLE PICKUP DRIVER USING A MULTIPLEXER FOR REDUCING THE NUMBER OF SIGNAL LINES

[75] Inventor: Takumi Ajima, Yokohama, Japan

[73] Assignee: Matsushita Electric Industrial Co., Ltd., Osaka, Japan

[21] Appl. No.: 1,625

[22] Filed: Jan. 7, 1993

[30] Foreign Application Priority Data

Jan. 14, 1992 [JP] Japan .................................. 4-004510

[51] Int. Cl.⁵ .............................................. G11B 7/00
[52] U.S. Cl. .................................. 369/124; 369/44.25; 369/44.29; 369/44.35; 369/121
[58] Field of Search ................... 250/201.5; 369/44.25, 369/44.27–44.29, 44.32, 44.34–44.35, 44.37, 44.41–44.42, 120, 121, 122, 124, 116

[56] References Cited

U.S. PATENT DOCUMENTS

| | | | |
|---|---|---|---|
| 4,700,056 | 11/1987 | Silvy et al. ...................... | 369/44.28 |
| 4,937,440 | 6/1990 | Hofer et al. .................... | 369/44.11 X |
| 5,050,149 | 9/1991 | Ishii et al. ...................... | 369/44.29 X |
| 5,084,849 | 1/1992 | Ishii et al. ...................... | 369/44.34 X |
| 5,199,011 | 3/1993 | McDonald et al. ......... | 369/44.27 X |

FOREIGN PATENT DOCUMENTS 2-81335  3/1990  Japan .

*Primary Examiner*—W. R. Young
*Attorney, Agent, or Firm*—Stevens, Davis, Miller & Mosher

[57] ABSTRACT

An optical pickup apparatus has a pickup movable part of integrally driven type in which the number of signal wires connected to the pickup driver part is decreased, and auxiliary signal wires required hitherto need not be provided. The optical pickup apparatus includes a pickup driver part including a semiconductor laser emitting a laser beam for forming a spot of the laser beam on a recording surface of a recording medium, a control circuit controlling the operation of the pickup driver part, and a plurality of signal wires connected between the pickup driver part and the control circuit for the signal transmission and reception between them. The control circuit includes a signal selector for selecting one of a plurality of input signals and outputting the selected signal, and a counter for supplying signal selecting information to the signal selector in a time division mode, so that the plural input signals can be supplied by the plural signal wires in a time division multiplex mode.

1 Claim, 3 Drawing Sheets

OPTICAL PICKUP APPARATUS INCLUDING A MOVEABLE PICKUP DRIVER USING A MULTIPLEXER FOR REDUCING THE NUMBER OF SIGNAL LINES

BACKGROUND OF THE INVENTION

1. Field of the Invention

This invention relates to an optical pickup apparatus for use in an optical disk apparatus in which various data, such as, audio data, video data and code data are recorded on and reproduced from a rotary disk by directing a laser beam.

2. Description of the Prior Art

FIG. 1 is a schematic perspective view showing a movable part of a prior art optical pickup apparatus. The movable part shown in FIG. 1 is that of an integrally driven optical pickup. Referring to FIG. 1, the prior art optical pickup apparatus includes an objective lens 31, a pickup driver part 32 having built-in optical elements including a semiconductor laser (referred to hereinafter as an LD), a magnet 33 for driving the pickup driver part 32, a plurality of wires 34a, 34b, 34c and 34d supporting the pickup driver part 32 so as to permit the operation of the pickup driver part 32 in the focusing and tracking directions and working also as signal lines for the transmission and reception of electrical signals between the pickup driver part 32 and an associated external circuit, a support plate 35 supporting the wires 34a to 34d to fix them in position, a plurality of auxiliary signal wires 36 compensating the function of the wires 34a to 34d when the wires 34a to 34d are insufficient to deal with all of the transmitted and received electrical signals, and a terminal plate 37 to which the auxiliary signal wires 36 are connected. Besides the optical pickup apparatus including the movable part of the optical pickup shown in FIG. 1, an optical pickup apparatus of the type in which the objective lens 31 only is arranged to move, and other optical elements are not arranged to move is frequently employed in this field. Nowadays, an optical pickup apparatus including a pickup movable part of integrally moving type as shown in FIG. 1 is most favorably employed in this field, because optically stable optical elements are integrally driven as a unit.

FIG. 2 is a block diagram showing the structure of a control circuit associated with the pickup driver part 32 of the prior art optical pickup apparatus shown in FIG. 1. In the control circuit shown in FIG. 2, it is supposed that a method of detecting astigmatism is based for the detection of a focusing error, and a method of three beam detection is based for the detection of a tracking error. Referring to FIG. 2, the control circuit includes a photo detector 41 receiving a laser beam reflected from a recording medium, a semiconductor laser 42, a pin diode (referred to hereinafter as a Pin) 43 for monitoring the output of the semiconductor laser 42, and a plurality of amplifiers 44a, 44b, 45a, 45b and 45c. Usually, the circuit elements lying on the left side of the dotted line 46 in FIG. 2 are mounted in the pickup driver part 32. However, in a high performance system in which self-adjustment is required, the circuit elements lying on the left side of the other dotted line 47 reassembled in the pickup driver part 32 in many cases, because signals, such as, signals FE+ and FE− are required before producing a focus error signal (referred to hereinafter as a signal FE). In this case, the pickup driver part 32 is connected to the associated external circuit by a total of eight signal lines, that is, signal lines for transmitting the signals FE+ and FE− respectively, signal lines for transmitting signals TE+ and TE− respectively for producing a tracking error signal (referred to hereinafter as a signal TE), a signal line extending from the LD 42, a signal line extending from the Pin 43, a signal line connected to ground GND, and a signal line connected to a voltage source Vcc. In the schematic diagram shown in FIG. 1, the number of wires 34a to 34d connected to the pickup driver part 32 is four. Therefore, the auxiliary signal wires 36 are utilized as the remaining four signal lines. Thus, when the control circuit controlling the pickup driver part 32 is divided along the dotted line 46 in FIG. 2, the total of the signal wires is seven, and the number of the required auxiliary signal wires 36 in FIG. 1 is three.

In the prior art optical pickup apparatus, the auxiliary signal wires 36 shown in FIG. 1 are provided in the form having a very small diameter or printed on a soft flexible printed circuit board (FPC) so as not to interfere with driving of the pickup driver part 32. However, in spite of the above contrivances, the adverse effect of the auxiliary signal wires 36 cannot be completely eliminated, and this leads to the problem that the desired control of the pickup driver part 32 cannot be satisfactorily achieved.

SUMMARY OF THE INVENTION

With a view to solve the prior art problem described above, it is an object of the present invention to provide an optical pickup apparatus in which the number of signal wires connected to the pickup driver part is decreased so as to realize an integrally driven optical pickup without the requirement of providing auxiliary signal wires.

The present invention which attains the above object provides an optical pickup apparatus comprising a pickup driver part including a semiconductor laser emitting a laser beam for forming a spot of the laser beam on a recording surface of a recording medium, control means for controlling the operation of the pickup driver part, and a plurality of signal wires connecting between the pickup driver part and the control means for the signal transmission and reception therebetween, the control means including signal selector means for selecting one of a plurality of input signals and outputting the selected signal, and counter means for supplying signal selecting information to the signal selector means in a time division mode, so that the plural input signals can be supplied by the plural signal wires in a time division multiplex mode.

In a modification of the optical pickup apparatus of the present invention, a semiconductor laser driver circuit is mounted in the pickup driver part so as to dispense with the signal wires for the two-pin semiconductor laser.

Because of the above construction of the optical pickup apparatus according to the present invention, various kinds of signals, such as, the signals FE+, TE+, etc. are inputted in a multiplex fashion to the single signal selector means built in the pickup driver part and are then selected in the time division mode to appear on the single output wire so as to satisfy the desired requirement. Thus, the number of required signal wires can be decreased.

Also, by mounting the semiconductor laser driver circuit in the pickup driver part, the signal wires for the two-pin semiconductor laser can be dispensed with.

DESCRIPTION OF THE PREFERRED EMBODIMENT

A preferred embodiment of the optical pickup apparatus according to the present invention will now be described by reference to FIGS. 3 to 5.

Figure 1:
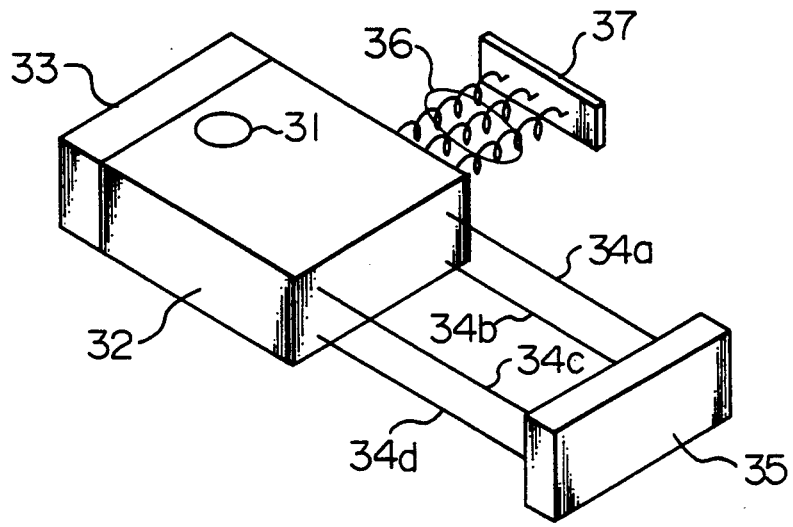
FIG. 1 is a schematic perspective view showing a movable part of a prior art optical pickup apparatus of integrally driven type.
Figure 2:
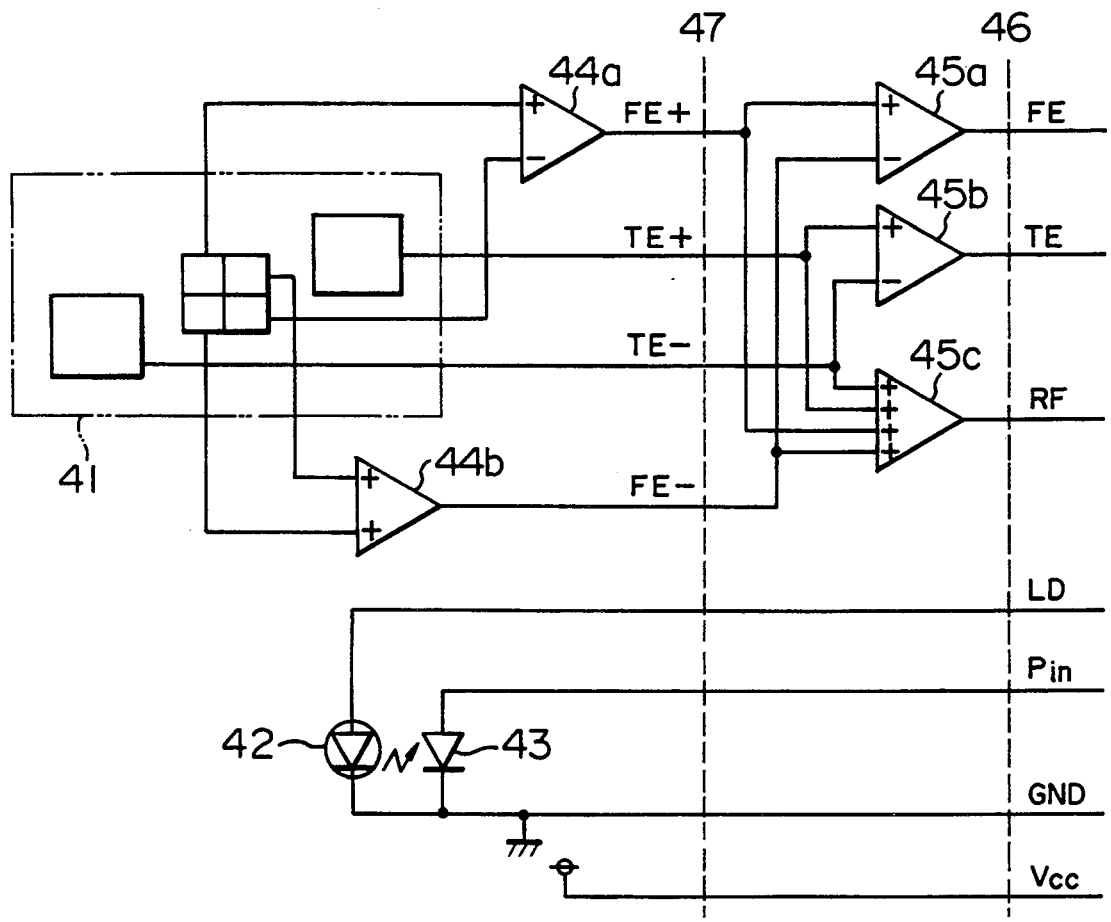
FIG. 2 is a circuit diagram showing the structure of a control circuit associated with the movable part of the prior art optical pickup apparatus shown in FIG. 1.
Figure 3:
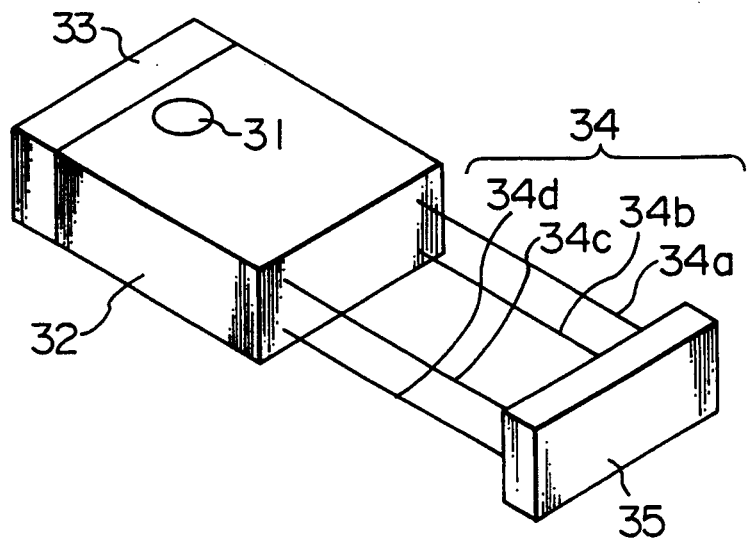
FIG. 3 is a schematic perspective view of a movable part in an embodiment of the integrally driven optical pickup apparatus according to the present invention.

FIG. 3 is a schematic perspective view of a movable part of an optical pickup apparatus of integrally driven type to which the present invention is applied. In FIG. 3, the same reference numerals and symbols are used to designate the same parts, signals, etc. appearing in FIG. 1 so as to dispense with duplication of the same description. The apparatus of the present invention differs from the prior art in that the auxiliary signal wires 36 and the terminal plate 37 supporting these auxiliary signal wires 36 shown in FIG. 1 are unnecessary. The movable part of the optical pickup includes an objective lens 31, a pickup driver part 32 having built-in optical elements including a semiconductor laser, a plurality of wires 34a, 34b, 34c and 34d movably supporting the pickup driver part 32 and working also as signal lines, and a support plate 35 to which the wires 34a to 34d are fixed.

Figure 4:
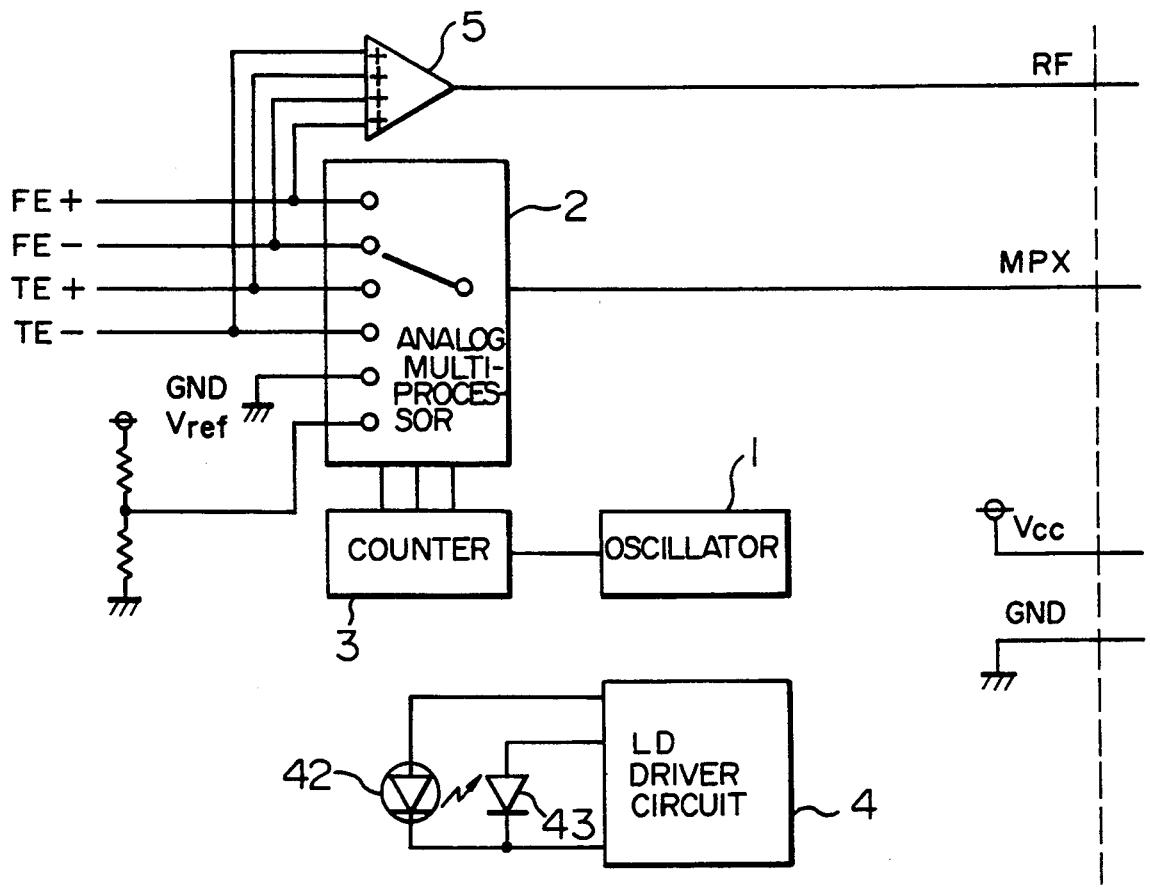
FIG. 4 is a circuit diagram showing the structure of a control circuit associated with the pickup movable part in the embodiment shown in FIG. 3.

FIG. 4 is a circuit diagram showing the structure of a control circuit associated with the movable part of the optical pickup. Referring to FIG. 4, the circuit includes an oscillator 1 (having an oscillation frequency of about 1 MHz), an analog multiplexer 2 receiving various kinds of signals as its inputs and selecting one of these signals as its output, a 3-bit counter 3 controlling the signal selecting operation of the multiplexer 2, a semiconductor laser driver circuit 4, and an amplifier 5 amplifying the various input signals. The oscillation output signal of the oscillator 1 is decoded by the counter 3, and the decoded signal from the counter 3 is applied as a selection input to the analog multiplexer 2. As shown in FIG. 4, signals GND, FE+, FE−, TE+, TE− and Vref are connected to the respective input terminals of the multiplexer 2. The signal Vref represents a potential which is approximately intermediate between the power supply voltage Vcc and the ground potential GND and is used to improve the anti-noise characteristic on the signal receiving side. The multiplexer 2 selects one of those input signals, and the selected signal appears as an output signal MPX. When the power supply voltage Vcc is supplied to the semiconductor laser driver circuit 4, the circuit 4 is turned on. Therefore, the semiconductor laser is turned on/off by turning on/off the power supply voltage Vcc supplied to the pickup driver part 32. When the input signals have a radio frequency, an output signal RF appears directly from the amplifier 5. In the embodiment of the present invention, input signals having a radio frequency are not multiplexed, because it is quite difficult to implement the signal multiplexing with a low cost due to the very high signal frequency range although the signal multiplexing can be theoretically achieved. However, it is apparent that this RF signal multiplexing is desirably put into practical use, provided that a suitable solution of this problem is provided.

Figure 5:
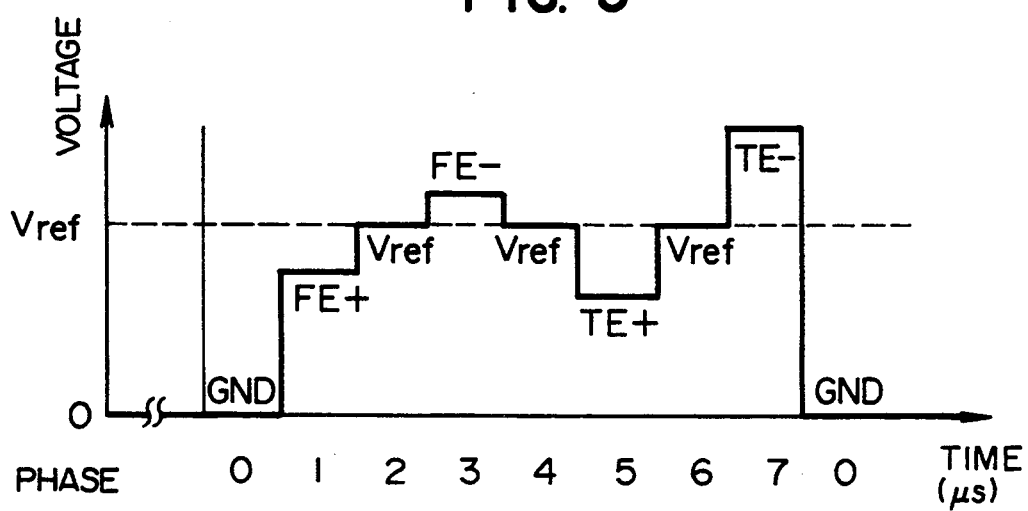
FIG. 5 shows a time series format of the output from the analog multiplexer shown in FIG. 4.

FIG. 5 shows a time series format of the output signal MPX from the analog multiplexer 2. Since the output signal MPX from the multiplexer 2 is under control of the 3-bit counter 3, the level of the output signal MPX is classified into eight phases as shown. For example, the phase 0 represents the signal GND, and the phase 1 represents the signal FE+. Thus, the various signals different from one another are sequentially outputted from the multiplexer 2, and, after the phase 7, the time series format returns to the phase 0 to repeat the signal output sequence shown in FIG. 5. The repetition period is about $\frac{1}{8}$ MHz. The signal GND of the phase 0 is used for the purpose of ensuring synchronization of the signal MPX with the receiving side. However, Vcc or other suitable signal may be employed as desired, provided that the signal so employed can be used to distinguish the signals FE+, FE−, etc. from the other signal which is the output signal RF from the amplifier 5. In the illustrated embodiment of the present invention, the level difference is is the basis for the distinction for the sake of simplicity. This is because the other output signal is generated from the amplifier 5, and the voltage of the GND level can be inhibited from being outputted.

On the other hand, on the signal receiving side, the level of the transmitted signal MPX is compared by a comparator with that of a lower voltage so as to detect the phase of the signal GND. When the phase of the signal GND is detected, the output signal MPX from the multiplexer 2 is then subjected to sampling/holding at a time interval of a predetermined period of time from the detected time. More specifically, the manner of sampling/holding the output signal MPX from the multiplexer 2 is such that, since the interval between the individual phases is about 1 $\mu$s, the signal FE+ of the phase 1 is then detected by sampling/holding after the period of 1.5 $\mu$s, the signal Vref of the phase 2 is then detected by sampling/holding after the period of 1 $\mu$s, and the signal FE− of the phase 3 is then detected by sampling/holding further after the period of 1 $\mu$s. Thereafter, it is desirable that, in the case of the signals other than the signal Vref, differentials between them and the signal Vref are necessarily to be taken. This is because, by so taking the differentials, noise attributable to the signal components of the same phase that may be picked up during the step of sampling/holding can be cancelled.

By the method described above, the number of required signal wires can be decreased to four as shown in FIG. 4. It will be seen in FIG. 4 that only four signal wires RF, MPX, Vcc and GND are now required. Thus, as shown in FIG. 3, the auxiliary signal wires 36 shown in FIG. 1 are now unnecessary.

It will be understood from the foregoing description that, in the optical pickup apparatus including the pickup driver part of integrally driven type according to the present invention, the input signals applied by the plural signal wires are multiplexed by the analog multiplexer, and the LD driver circuit is mounted in the pickup driver part, thereby decreasing the number of the required signal wires. Therefore, the auxiliary signal wires required hitherto need not be provided, so that the productivity of the optical pickup apparatus can be improved without degrading the driving characteristic for the movable part of the optical pickup.

Further, the optical pickup apparatus can be made small in size and light in weight and can stably operate by integrally combining the semiconductor laser with the control circuit mounted in the pickup driver part.

What is claimed is:

1. An optical pickup apparatus comprising:
    a pickup driver part including a semiconductor laser emitting a laser beam for forming a spot of the laser beam on a recording surface of a recording medium;
    control means for controlling the operation of said pickup driver part; and
    a plurality of signal wires connected between said pickup driver part and said control means for transmitting and receiving signals therebetween,
    wherein said pickup driver part includes signal selector means for selecting one of a plurality of input signals and outputting the selected signal, and counter means for supplying signal selecting information to said signal selector means in a time division mode, such that the plural input signals can be supplied by said plural signal wires in a time division multiplex mode, said plural input signals being supplied together with a reference voltage signal by said plural signal wires on the signal transmitting side, and the level differential between said selected signal and said reference voltage signal is detected on the signal receiving side.

* * * * *